April 28, 1964     A. MUSSCHOOT     3,130,831
BASE CONSTRUCTION FOR VIBRATORY FEEDER
Filed June 27, 1961     2 Sheets-Sheet 1
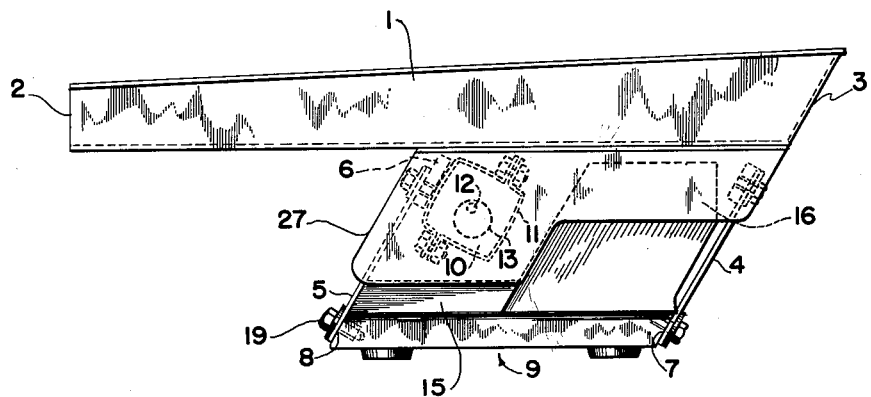
Fig. I
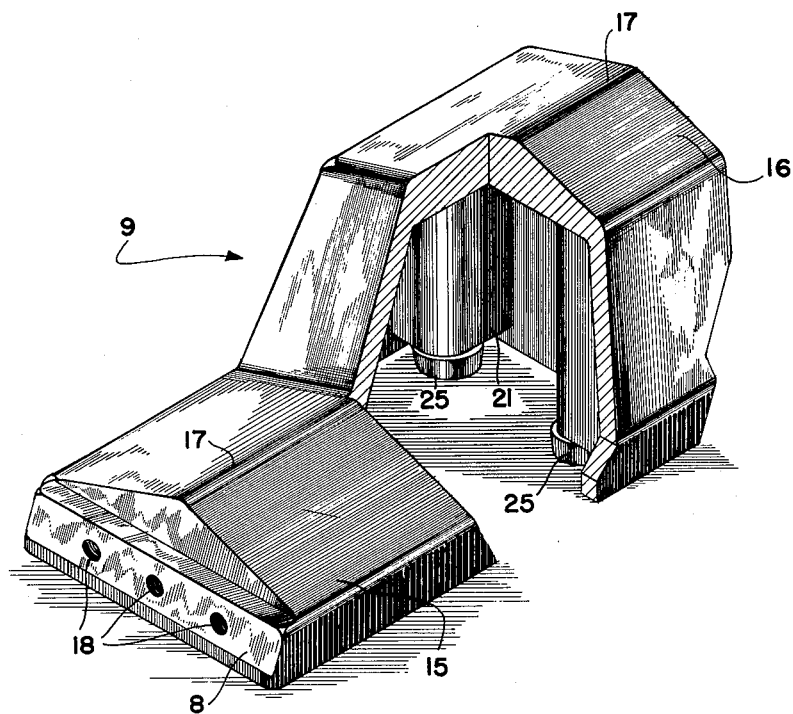
Fig. II
*INVENTOR.*
ALBERT MUSSCHOOT
BY *Marshall & Wilson*
ATTORNEYS April 28, 1964   A. MUSSCHOOT   3,130,831
BASE CONSTRUCTION FOR VIBRATORY FEEDER
Filed June 27, 1961   2 Sheets-Sheet 2
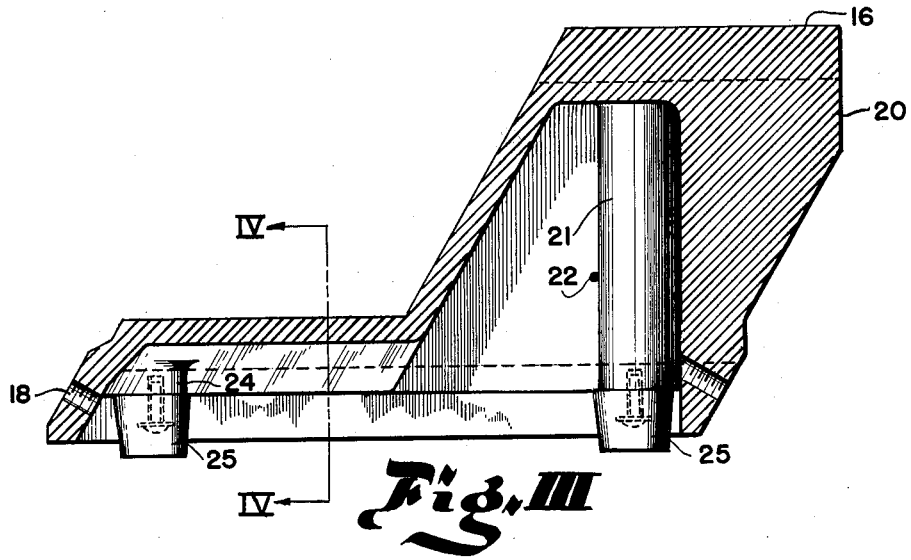
Fig. III
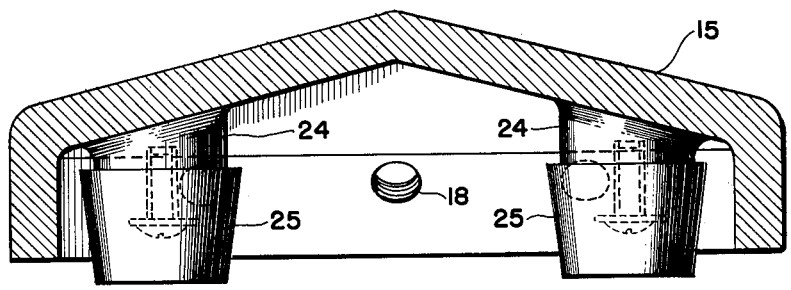
Fig. IV
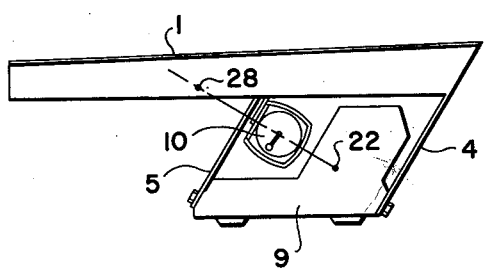
Fig. V
INVENTOR.
ALBERT MUSSCHOOT
BY
Marshall & Wilson
ATTORNEYS 3,130,831
BASE CONSTRUCTION FOR VIBRATORY FEEDER
Albert Musschoot, Barrington, Ill., assignor to Chain Belt Company, Milwaukee, Wis., a corporation of Wisconsin
Filed June 27, 1961, Ser. No. 119,923
7 Claims. (Cl. 198—220)

This invention relates to small vibratory conveyors and in particular to an improved base assembly for a small vibratory conveyor.

One of the difficulties often encountered in small portable conveyors particularly where the trough is fairly long with respect to the base is that it is difficult to get a uniform vibratory action throughout the length of the conveyor so that products will feed uniformly in speed along the length of the conveyor.

Another problem encountered with small vibratory conveyors is the tendency of a small portable conveyor to move around or travel on its supporting surface and to execute, if resiliently supported, uncontrolled vibrations of the system as a whole which reduces the conveying efficiency.

The principal object of this invention is to provide a small tuned eccentric weight driven vibratory feeder that is entirely self contained and in which substantially uniform vibratory action occurs throughout the length of the conveyor trough.

Another object of the invention is to provide a base for a small vibratory conveyor that has its mass arranged so that the vibration of the conveyor trough and the base is in translation with a very little pitching motion of the assembly as a whole.

More specific objects and advantages are apparent from the following description of a preferred form of the invention.

According to the invention a small tuned eccentric weight driven vibratory feeder comprises a rigid trough, a base mounted under the receiving end of the trough and having its mass concentrated near the receiving end with a toe portion extending forward under the central portion of the trough, an electric motor that has eccentric weights on its armature shaft and that is mounted on the underside of the trough near its central portion, and cantilever leaf springs supporting the trough from the ends of the base member.

A preferred embodiment of the invention is illustrated in the accompanying drawings.

In the drawings:

FIG. I is a side elevation of a small vibratory feeder constructed according to the invention.

FIG. II is an isometric, partially broken away illustration of the base of the improved vibratory conveyor.

FIG. III is a vertical longitudinal section through the base of the improved vibratory assembly.

FIG. IV is a transverse vertical section taken substantially along the lines IV—IV of FIG. III.

FIGURE V is a schematic diagram showing the locations of the centers of gravity of the portions of the vibratory feeder.

These specific figures and the accompanying description are intended merely to illustrate the invention and not to impose limitations on its scope.

In a small vibratory conveyor constructed according to the invention an elongated conveyor trough 1 is open at its discharge end 2 and closed by an end wall 3 at its material receiving or loading end. The trough is U-shaped in cross section, the sides providing rigidity so that under the influence of vibration the trough moves as a rigid unit. The trough is supported on spaced parallel cantilever springs 4 and 5, the springs 4 being connected to a depending portion of the trough 1 under its receiving end 3 while the springs 5 are attached to a cross member 6 at the mid portion of the trough. The lower ends of the springs 4 and 5 are connected to inclined faces 7 and 8 of a base 9 that is located generally under the receiving end of the trough 1.

A small variable speed electric motor 10 is held in clamps 11 attaching it to the cross member 6 of the conveyor. An armature shaft 12 of the motor 10 carries eccentric weights 13 at each end. The rotation of the eccentric weights provides the vibratory force for driving the conveyor.

The base 9 as seen from the side in FIG. I, is shaped like a shoe having a toe portion 15 extending forwardly under the motor 10 and having a portion 16 corresponding to the ankle receiving portion of a work shoe located under the receiving end of the trough 1 and extending upward almost to the trough 1. The cantilever springs 4 and 5 are inclined to the vertical at angles of approximately 30° and are attached to similarly inclined surfaces at the heel and toe portions of the base 9. The stiffness of the cantilever springs 4 and 5 is selected so that the system comprising the conveyor trough 1 plus the motor 10 as one mass and the base 9 as a second mass connected to the first mass by means of the springs 4 and 5 forms a resonant system having a natural frequency near the operating speed of the motor 10. Preferably this resonant frequency is slightly above the full speed of the motor so that by reducing the speed of the motor the system operates at a frequency more removed from resonance and therefore at a smaller amplitude.

The base 9, as may be seen in FIGS. II, III and IV is hollow and open at the bottom. Its interior is shaped so that it can be easily manufactured by a casting process using permanent molds, the mold forming the interior of the housing 8 being removable as a unit.

Preferably, the housing 9, particularly in the toe portion but also in the upper portion, is shaped like a shallow roof having a ridge 17 extending along the longitudinal center line with the upper sides of the toe portion and the upper sides of the upper part of the heel portion sloping from the ridge 17 toward the sides of the housing. Any material that drops onto these surfaces, by reason of the vibratory motion of the housing, travels down these surfaces and is discharged along the side of the housing. The forward portion of the toe 15 is formed with a relatively thin wall section that extends forward and terminates in the inclined surfaces 8 to which the cantilever springs 5 are attached. Tapped mounting holes 18 are provided in the surface 8 to receive cap screws 19 by which the springs are clamped to the housing.

The heel portion of the housing 9 as may be seen in the cross section of FIG. III has a relatively massive portion 20 and also includes additional masses 21 fitting into the interior corners of the box-shaped heel portion at each of the rear corners. This provides a substantial amount of mass in the upper rear portion of the housing which shifts the center of gravity of the housing as a whole to a point somewhere near a point 22 shown in FIG. III and reduces the amplitude of vibration of the base as compared to the amplitude of vibration of the trough.

Downwardly directed bosses 24 at the forward interior corners of the toe portion 15 and the bottoms of the corner masses 21 at the rear corners of the housing are fitted with downwardly directed resilient or shock absorbing feet 25 adapted to support the vibrator base from any convenient surface. The resilient feet 25 provide sufficient resiliency to accommodate the vibratory motion of the base without transmitting substantial vibratory force to the supporting surface or causing slippage of the feet 25 on such surface.

To further protect the base 9 from any accumulation of foreign material thereon, the conveyor trough 1 is provided with a skirt 27 the forward portion of which extends down to cover the upper portions of the spring 5 and the sides of which come down to closely overlie the sides of the base 9.

In this arrangement, as shown in FIG. V, if the center of gravity 28 of the conveyor trough 1 including the motor 10 and the center of gravity 22 of the base 9 lie on a line that is perpendicular to the springs 4 and 5 and passes through the axis of the motor 10 the trough 1 tends to vibrate in translation only. Under this condition materials will feed with equal speed along the full length of the conveyor trough.

It is sometimes preferable to have the material feed more rapidly as it approaches the discharge end 2 of the trough 1. This may be accomplished if the center of gravity of the base 9 is raised into the upper portion 16 by increasing the mass of the section 20 so that a line joining the center of gravity of the base 9 and the center of gravity of the conveyor 1 passes above the axis of the armature shaft 12 of the motor 10. When the center of gravity is so arranged the force of the eccentric weight 13 provides a couple acting about the composite center of gravity of the system tending to cause an oscillatory rotation of the system about the center of gravity in addition to the linear vibratory motion of the conveyor 1. This combined motion is an oscillation about the center of percussion of the system. By suitable location of the center of gravity this combination of rotary and translatory vibration gives an additive effect near the discharge end to the trough and a subtractive effect near the inlet end 3. Under this condition material feeds slowly at the receiving end and rapidly at the discharge end.

In the conveyor arrangement shown in FIG. I counterclockwise rotation of the motor provides the maximum conveying speed because the orbital motion of the conveyor as the result of the circular motion of the eccentric weight produces components of vibration tending to advance the material along the conveyor 1. This is in addition of the resonance effect that accents the motion perpendicular to the length of the cantilever springs 4 and 5. If however, it is preferred to secure a maximum difference in conveying speed with changes in motor speed it is desirable that when the motor is operating at lower speed out of resonance that the orbital motion retard the conveying of material. To get this effect the motor should be operated in a clockwise direction. When it is operated in a clockwise direction and the speed of the motor approaches a resonance condition of the feeder the linear vibratory motion in response to resonance overrides the effect of the orbital motion and provides the conveying of material toward the discharging end 2. This effect is of particular advantage when the feeder is used for discharging in the weighing system as in filling packages or similar operations when it is desired to feed the bulk of the material at a rapid rate and then dribble in the final portions to reach the desired weight.

Various modifications of the illustrated structure may be made without departing from the spirit and scope of the invention.

Having described the invention, I claim:

1. In a vibratory feeder, in combination, a conveyor pan of generally uniform cross section having a material receiving end and a discharge end, a base located under the receiving end of said pan, a plurality of spaced parallelly extending cantilever springs connecting the pan to the base, said springs extending along lines inclined upwardly toward the receiving end of the pan, a motor mounted on the pan with its center of gravity located generally on a line perpendicular to said springs and passing through the center of gravity of the conveyor pan, eccentric weights mounted on the shaft of the motor, said base having a low roof-shaped portion located under the mid-portion of said conveyor pan and a box-like portion located under the receiving end of the conveyor pan, said box-like portion having heavy walls and roof sections whereby the center of gravity of said base is located under the receiving end of said pan generally on the line perpendicular to said springs and passing through the center of gravity of said pan.

2. In a vibratory conveyor, in combination, a conveyor pan of generally uniform weight per unit of length having a receiving end and a discharge end, a base located under the receiving end of the pan and extending approximately to the center of the pan, a plurality of spaced parallelly extending cantilever springs connecting the pan to the base, said springs being inclined toward the receiving end of the pan, a motor having an eccentrically loaded armature shaft mounted on the under side of the pan intermediate the center of the pan and its receiving end, said base having a lower portion extending toward the discharge end of the pan and a higher portion beneath the receiving end of the pan, said higher portion being of substantially greater mass than said lower portion such that a line passing through the centers of gravity of the pan and base is substantially perpendicular to the cantilever springs.

3. In a vibratory conveyor, in combination, a conveyor pan of generally uniform weight per unit of length having a receiving end and a discharge end, a base located under the receiving end of the pan and extending at least to the midpoint of the pan, a plurality of spaced parallelly extending cantilever springs connecting the pan to the base, said springs being inclined toward the receiving end of the pan, a motor having an eccentrically loaded armature shaft mounted on the under side of the pan intermediate the center of gravity of the pan and its receiving end; means for driving the motor at a speed near but less than the natural frequency of the pan on the cantilever springs, said base being arranged with spring seats for said cantilever springs at each end thereof and a portion of substantial mass extending into close proximity of the pan at the receiving end thereof.

4. In a vibratory conveyor, in combination, a conveyor pan of generally uniform weight per unit of length having a discharge end and a receiving end, a base located generally under the receiving end of the pan, a plurality of spaced apart parallelly extending cantilever springs connecting the base and the pan, said springs being rigidly attached to spring seats formed on the ends of said base and extending upwardly in an inclined direction toward the receiving end of the pan, a motor having an eccentrically loaded shaft mounted on the pan intermediate its center and receiving end, said motor having an adjustable operating speed the upper limit of which is generally equal to the resonant frequency of the system comprising the pan coupled to the base through said springs, said base having a first portion of low elevation located under said motor and a second portion of high elevation located under the receiving end of the pan, said second portion having substantial mass in excess of the mass of the pan, and both said portions having laterally inclined upper surfaces.

5. In a vibratory conveyor, in combination, an elongated conveyor pan having a receiving and a discharge end, a base located generally under the receiving end of the pan, inclined spring seats formed on each end of said base, a plurality of cantilever springs mounted on said spring seats and extending upwardly in an inclined direction to be attached to the receiving end of said pan, an eccentric weight shaft journaled on the pan intermediate its center and receiving end, means for rotating the shaft, said base having a portion of low elevation and small mass extending under said eccentric weight shaft and a portion of high elevation and large mass located adjacent the cantilever spring at the receiving end of the pan, both of said portions having laterally sloping upper surfaces, and a skirt depending from said pan enclosing said weight shaft and telescopically surrounding the upper rims of said base portions.

6. A vibratory conveyor according to claim 4 in which the base and conveyor is resiliently mounted and the orbital motion of the conveyor tends to retard the flow of material.

7. A vibratory conveyor according to claim 4 in which the base and conveyor is resiliently mounted and the axis of rotation of the eccentrically loaded shaft is generally intermediate the center of gravity of the conveyor and the composite center of gravity of the conveyor and base.

References Cited in the file of this patent

UNITED STATES PATENTS 2,997,158     Moskowitz _____ Aug. 22, 1961

FOREIGN PATENTS 698,604     Great Britain _____ Oct. 21, 1953
62,136     France _____ July 10, 1955